United States Patent
Chen (10) Patent No.: US 10,824,023 B2
(45) Date of Patent: Nov. 3, 2020

(54) DISPLAY PANEL, PREPARATION METHOD THEREOF, AND LIQUID CRYSTAL DISPLAY

(71) Applicant: SHENZHEN CHINA STAR OPTOELECTRONICS TECHNOLOGY CO., LTD., Shenzhen (CN)

(72) Inventor: Xingwu Chen, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/033,228

(22) Filed: Jul. 12, 2018

(65) Prior Publication Data

US 2019/0204648 A1 Jul. 4, 2019

Related U.S. Application Data

(63) Continuation of application No. PCT/CN2018/073685, filed on Jan. 23, 2018.

(30) Foreign Application Priority Data

Dec. 29, 2017 (CN) .......................... 2017 1 1497925

(51) Int. Cl.
| | |
|---|---|
| *G02F 1/1333* | (2006.01) |
| *G02F 1/1339* | (2006.01) |
| *C09K 19/54* | (2006.01) |
| *C09K 19/12* | (2006.01) |
| *C09K 19/30* | (2006.01) |
| *C09K 19/04* | (2006.01) |

(52) U.S. Cl.
CPC ........ *G02F 1/13394* (2013.01); *C09K 19/544* (2013.01); *C09K 2019/0448* (2013.01); *C09K 2019/122* (2013.01); *C09K 2019/3018* (2013.01); *C09K 2019/546* (2013.01); *G02F 1/133305* (2013.01); *G02F 2001/13398* (2013.01); *G02F 2202/022* (2013.01)

(58) Field of Classification Search
CPC .............. G02F 1/1333; G02F 1/13394; G02F 1/133305; G02F 2001/13398; G02F 2202/022; C09K 19/544; C09K 2019/546
USPC ..................................................... 252/299.01
See application file for complete search history.

(56) References Cited

U.S. PATENT DOCUMENTS

| | | | |
|---|---|---|---|
| 2009/0015776 A1* | 1/2009 | Lyu ....................... | G02F 1/1337 349/143 |
| 2015/0129801 A1 | 5/2015 | Fujita et al. | |
| 2016/0154259 A1 | 6/2016 | Kim et al. | |
| 2018/0171235 A1 | 6/2018 | Chen | |

FOREIGN PATENT DOCUMENTS

| | | |
|---|---|---|
| CN | 103149725 A | 6/2013 |
| CN | 103197476 A | 7/2013 |
| CN | 10377420 A | 5/2014 |
| CN | 106019681 A | 10/2016 |
| CN | 205620652 U | 10/2016 |
| CN | 106281365 A | 1/2017 |
| CN | 205899207 U | 1/2017 |
| JP | 09-255706 * | 9/1997 ........... G02F 1/1333 |
| WO | 2016206771 A1 | 12/2016 |

* cited by examiner

*Primary Examiner* — Geraldina Visconti

(57) ABSTRACT

The present disclosure provides a display panel, a preparation method thereof, and a liquid crystal display. The display panel includes a first substrate, a second substrate opposite to the first substrate, a liquid crystal layer between the first substrate and the second substrate, and a polymerizable monomer arranged in the liquid crystal layer; wherein a plurality of polymer walls are arranged in the liquid crystal layer; the polymer wall contacts to the first substrate and the second substrate, and a polymerization direction of the polymerizable monomer in the polymer wall is substantially perpendicular to a thickness direction of the polymer wall. By arranging a plurality of polymer walls to limit the flow of the liquid crystal in a liquid crystal layer, improve an edge roughness of a polymer wall, so as to improve light leakage from an edge of pixels and improve a display effect.

7 Claims, 3 Drawing Sheets

DISPLAY PANEL, PREPARATION METHOD THEREOF, AND LIQUID CRYSTAL DISPLAY

CROSS-REFERENCE TO RELATED APPLICATIONS

The present application is a continuation-application of International (PCT) Patent Application No. PCT/CN2018/073685, field on Jan. 23, 2018, which claims foreign priority of Chinese Patent Application No. 201711497925.1, field on Dec. 29, 2017 in the State Intellectual Property Office of China, the entire contents of which are hereby incorporated by reference.

FIELD

The described embodiments relate to a technology of a display, and more particularly, to a display panel, a preparation method thereof, and a liquid crystal display.

BACKGROUND

In recent years, with the rapid development of display technologies, people are increasingly demanding displays. In particular, the demand for non-flat display devices such as flexible liquid crystal displays, curved liquid crystal displays, flexible liquid crystal displays, and foldable liquid crystal displays is gradually increasing. However, these display devices are unevenly distributed in the surface during bending, resulting in a flow of the liquid crystal and a non-uniform cell thickness, thereby causing a problem of reduced a display quality. Maintaining a uniformity of the thickness of the flexible display cell during bending and limiting the flow of the liquid crystal has become the biggest problems in the field of flexible display.

SUMMARY

A problem mainly solved by the present disclosure is to provide a display panel, a preparation method thereof, and a liquid crystal display, thereby the flow of the liquid crystal in a liquid crystal layer may be limited, an edge roughness of a polymer wall may be improved, so that a light leakage from an edge of pixels and a display effect may be improved.

In order to solve the above-mentioned technical problem, a technical solution adopted by the present disclosure is to provide a display panel and a backlight, wherein the display panel comprises: a first substrate, a second substrate opposite to the first substrate, a liquid crystal layer between the first substrate and the second substrate, and a polymerizable monomer arranged in the liquid crystal layer; wherein a plurality of polymer walls are arranged in the liquid crystal layer, and the polymer wall comprises a plurality of first polymer walls extending to a first direction and a plurality of second polymer walls extending to a second direction; the first direction and the second direction are substantially parallel to a surface of the first substrate; the plurality of the first polymer walls and the plurality of the second polymer walls are interlaced to form a grid shape, wherein each grid in the grid shape corresponds to a pixel; wherein the polymerizable monomer comprises at least one of acrylate, acrylate derivatives, methacrylate, methacrylate derivatives, cinnamate, coumarin, styrylpyridine, styryl phthalimidine, and diphenylacetylene.

In order to solve the above-mentioned technical problem, a technical solution adopted by the present disclosure is to provide a display panel comprising: a first substrate, a second substrate opposite to the first substrate, a liquid crystal layer between the first substrate and the second substrate, and a polymerizable monomer arranged in the liquid crystal layer; wherein a plurality of polymer walls are arranged in the liquid crystal layer; the polymer wall contact to the first substrate and the second substrate, and a polymerization direction of the polymerizable monomer in the polymer wall is substantially perpendicular to a thickness direction of the polymer wall.

In order to solve the above-mentioned technical problem, a technical solution adopted by the present disclosure is to provide a preparation method for a display panel comprising: providing a display panel comprising a first substrate, a second substrate opposite to the first substrate, a liquid crystal layer between the first substrate and the second substrate, and a polymerizable monomer arranged in the liquid crystal layer; covering the display panel by a mask plate, wherein a portion with through holes is arranged in the mask plate; irradiating the mask plate by ultraviolet light, to form a polymer wall in the liquid crystal layer corresponding to the portion with through holes.

Advantages of the disclosure may follow. By adding the polymerizable monomer in the liquid crystal layer, the polymerizable monomer may be proceeded a polymerization reaction to form the plurality of polymer walls with directionality, thereby the flow of liquid crystals may be limited in the liquid crystal layer. Because the polymerization direction of the polymerizable monomer in the polymer wall may be directional, and the polymerization direction may be substantially perpendicular to the thickness direction of the polymer wall. An edge of the polymer wall may not occur protrusions easily, so as to improve a roughness of the edge of the polymer wall, thereby a light leakage may be improved at an edge of pixels and a display effect may be improved.

BRIEF DESCRIPTION OF THE DRAWINGS

In order to clearly illustrate the technical solutions of the present disclosure, the drawings used in the description of the embodiments will be briefly described. It is understood that the drawings described herein are merely some embodiments of the present disclosure. Those skilled in the art may derive other drawings from these drawings without inventive effort.

DETAILED DESCRIPTION

The detailed description set forth below is intended as a description of the subject technology with reference to the appended figures and embodiments. It is understood that the embodiments described herein include merely some parts of the embodiments of the present disclosure, but do not include all the embodiments. Based on the embodiments of the present disclosure, all other embodiments that those skilled in the art may derive from these embodiments are within the scope of the present disclosure.

Figure 1:
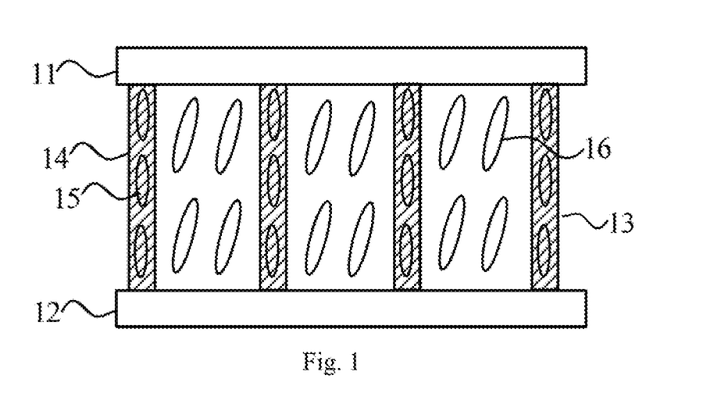
FIG. 1 is a structural illustration of a display panel in accordance with an embodiment in the present disclosure.

Referring to FIG. 1, FIG. 1 is a structural illustration of a display panel in accordance with an embodiment in the present disclosure. FIG. 1 is a side sectional view of the display panel. The display panel may comprise: a first substrate 11, a second substrate 12 opposite to the first substrate 11, and a liquid crystal layer 13 between the first substrate 11 and the second substrate 12.

The first substrate 11 and the first substrate 12 may be flexible substrates, such as transparent plastic substrates, and may also be glass or other substrates. In a twisted nematic (TN) or a super twisted nematic (STN) liquid crystal panel, the first substrate 11 may comprise a thin-film transistor (TFT) structure and a pixel electrode layer, and the second substrate 12 may comprise a common electrode layer and a color filter. In addition, in an in-plane switching (IPS) liquid crystal panel, the common electrode layer may also be arranged in the first substrate 11 to form a horizontal electric field by the pixel electrode layer. In addition, in a color filter on array (COA) liquid crystal panel, the color filter may also be arranged in the first substrate 11. It may be understood that, types of the liquid crystal display panel may not be required, and may be applied to all the liquid crystal display panels.

An alignment film may be coated on the first substrate 11 and the first substrate 12. Liquid crystal molecules 16 may be formed a preset angle when the alignment film is irradiated by ultraviolet light. The alignment film may be polyimide, polyamic acid, or the like that is conventionally used. Liquid crystals may be dropped on the first substrate 11 and the first substrate 12 to form a liquid crystal cell structure.

The first substrate 11 and the second substrate 12 may be merged. An edge of the active area (AA) may be coated with a glue to form a plastic frame. Then, the first substrate 11 and the second substrate 12 may be bonded together. It may be understood that, because through holes may be left on the plastic frame, a gap between the first substrate 11 and the second substrate 12 may be to vacuumed, and then a liquid crystal material may be poured via the through holes to form the liquid crystal layer 13.

A main liquid crystal material used in the liquid crystal layer 13 may be a nematic liquid crystal material. The nematic liquid crystal may be composed of a rod-like molecule having a large aspect ratio, and may have fluidity similar to ordinary liquid. The molecule may be not arranged in layers, and may slide up and down, slide left and right, and slide back and forth. The molecule may keep only being parallel or being substantially parallel to each other in a long axis direction of the molecule. Compared with a smectic liquid crystal, the nematic liquid crystal may have a small viscosity and may be a high fluidity.

A plurality of polymer walls 14 may be arranged in the liquid crystal layer 13. The polymer wall 14 may contact to the first substrate 11 and the second substrate 12. The polymer wall 14 may be formed by a polymerization reaction of a polymerizable monomer 15. A polymerization direction of the polymerizable monomer 15 in the polymer wall 14 may be substantially perpendicular to a thickness direction of the polymer wall 14.

It may be understood that, the polymerizable monomer 15 may have a photo-reactive characteristic, and the polymerization reaction may be proceeded when irradiated by ultraviolet light. During the ultraviolet light irradiating, because a randomness property of the polymerization reaction of the polymerizable monomers 15, when the polymer wall 14 is formed by the polymerizable monomer 15 in the liquid crystal cell, protrusions may also be formed on the edges of the polymer wall 14, resulting the light leakage from the edge of the pixels, which may affect the display quality.

In the present embodiment, the polymerization direction of the polymerizable monomer 15 in the polymer wall 14 may be substantially perpendicular to the thickness direction of the polymer wall 14, i.e., a long axis direction of the polymerizable monomer 15 may be substantially parallel to a wall surface of the polymer wall 14. It may make the wall surface of the polymer wall 14 be smoother and may reduce a possibility of the protrusion occurring.

Therefore, in the above-mentioned description, when the polymerization reaction of the polymerizable monomer 15 is proceeded in a specific direction, the polymer wall 14 may be formed. The polymer wall may be formed at the gap between pixel regions to restrict the flow of the liquid crystal, and the polymerizable monomer 15 may be polymerized in a direction substantially perpendicular to surfaces of the first and the second substrates. It may prevent the edge of the polymer wall from being rough because the randomness property of the polymerization reaction, and may reduce the light leakage occurring.

The polymerizable monomer 15 may comprise at least one of acrylate, acrylate derivatives, methacrylate, methacrylate derivatives, cinnamate, coumarin, styrylpyridine, styryl phthalimidine, and diphenylacetylene.

A structural formula of the polymerizable monomer 15 may be selected from the group consisting of A range of the n may be 1-7, and a structural formula of the A may be selected from the group consisting of Structural formulas of the A1 and the A2 may be selected from the group consisting of R, The R may be selected from the group consisting of $C_mH_{2m+1}$, $OC_mH_{2m+1}$, $C_mH_{2m}$, and $OC_mH_{2m}$, and the m may be an integer between 1-30. The x1 and the x2 may be selected from the group consisting of cyclopropane, cyclobutane, cyclopentane, cyclohexane, cyclopentadiene, and benzene.

For example, the structural formula of the polymerizable monomer 15 may be

As compared with the related art, by adding the polymerizable monomer in the liquid crystal layer, the polymerizable monomer may be proceeded the polymerization reaction to form the plurality of polymer walls with directionality, thereby the flow of liquid crystals in the liquid crystal layer may be limited. Because the polymerization direction of the polymerizable monomer in the polymer wall is directional, the polymerization direction is substantially perpendicular to the thickness direction of the polymer wall. The edge of the polymer wall may not occur the protrusion easily, so as to improve a roughness of the edge of the polymer wall, thereby the light leakage may be improved at the edge of pixels and the display effect may be improved.

Figure 2:
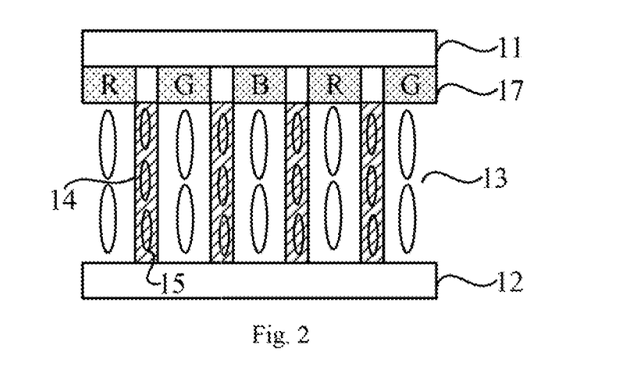
FIG. 2 is a structural illustration of a display panel in accordance with another embodiment in the present disclosure.
Figure 3:
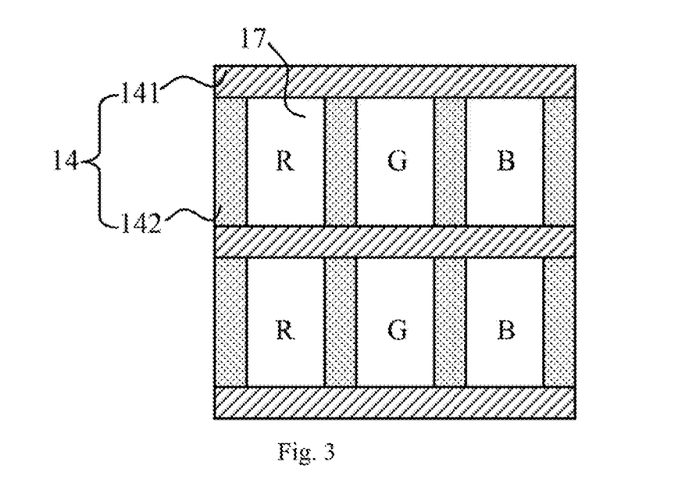
FIG. 3 is a front sectional view of a display panel in accordance with another embodiment in the present disclosure.

Referring to FIG. 2 and FIG. 3, FIG. 2 is a structural illustration of a display panel in accordance with another embodiment in the present disclosure. The display pane may comprise: a first substrate 11, a second substrate 12 opposite to the first substrate 11, and a liquid crystal layer 13 between the first substrate 11 and the second substrate 12.

A polymer wall 14 may be formed in a gap between two adjacent pixels in a pixel region 17. A plurality of polymer walls 14 may be arranged in the liquid crystal layer 13. The polymer wall 14 may contact to the first substrate 11 and the second substrate 12. A polymerization direction of a polymerizable monomer 15 in the polymer wall 14 may be substantially perpendicular to a thickness direction of the polymer wall 14.

Referring to FIG. 3. FIG. 3 is a front sectional view of a display panel in accordance with another embodiment in the present disclosure. The polymer wall 14 may comprise a plurality of first polymer walls 141 extending to a first direction and a plurality of second polymer walls 142 extending to a second direction. The plurality of the first polymer walls 141 and the plurality of the second polymer walls 142 may be interlaced to form a grid shape. A polymerization direction of the polymerizable monomer 15 may be substantially perpendicular to the display panel. Each grid in the grid shape may correspond to a pixel. In an embodiment, an extending direction of the first polymer wall 141 and an extending direction of the second polymer wall 142 may be substantially perpendicular to each other, and may also form a preset angle.

A polymerization direction of the polymerizable monomer 15 in the first polymer wall 141 may be substantially perpendicular to a thickness direction of the first polymer wall 141, i.e., the polymerization direction of the polymerizable monomer 15 in the first polymer wall 141 may be substantially parallel to a wall surface of the first polymer wall 141. A polymerization direction of the polymerizable monomer 15 in the second polymer wall 142 may be substantially perpendicular to a thickness direction of the second polymer wall 142, i.e., the polymerization direction of the polymerizable monomer 15 in the second polymer wall 142 may be substantially parallel to a wall surface of the second polymer wall 142.

It may be understood that, upper and lower sides of the polymer wall 14 may contact to the first substrate 11 and the second substrate 12 respectively. The wall surface of the polymer wall 14 may be substantially perpendicular to the first substrate 11 and the second substrate 12. The thickness direction of the polymer wall 14 may be also substantially perpendicular to the first substrate 11 and the second substrate 12. Thus, the polymerization direction of the polymerizable monomer 15 may be the following two conditions:

1. Referring to FIG. 1 and FIG. 2, the polymerization direction of the polymerizable monomer 15 may be substantially perpendicular to the first substrate 11 or the second substrate 12, so that the wall surface of the polymer wall 14 may not have the protrusions and may be more smooth.

2. The polymerization direction of the polymerizable monomer 15 may be only substantially parallel to the wall surface of the polymer wall 14, and may form a certain angle with the first substrate 11 or the second substrate 12, so that the wall surface of the polymer wall 14 may not have the protrusions and may be more smooth.

The first polymer wall 141 and the second polymer wall 142 may be substantially perpendicular to each other and may interlace with each other to surround the pixel region 17, so that the liquid crystal molecules may be in the pixel region 17. Thereby, the flow of the liquid crystal molecules may be restricted. In a specific area irradiated by the ultraviolet light, a shape of the polymerizable monomer 15 may be a wall structure, a branch structure, or a cross-linked structure with a void, which may be determined by chemical properties of the polymerizable monomer 15.

As compared with the related art, by adding a polymerizable monomer in a liquid crystal layer, the polymerizable monomer may be proceeded the polymerization reaction to form a plurality of first polymer walls and a plurality of second polymer walls with directionality. The first polymer wall and the second polymer wall may be interlaced to form a grid shape, thereby the flow of liquid crystals in the liquid crystal layer may be limited. The polymerization direction of the polymerizable monomer in the first polymer wall may be substantially parallel to a polymerization direction of the polymerizable monomer in the second polymer wall. The edge of the polymer wall may not occur the protrusions easily, so that a roughness of the edge of the polymer wall may be improved, thereby a light leakage may be improved at an edge of pixels and a display effect may be improved.

Figure 4:
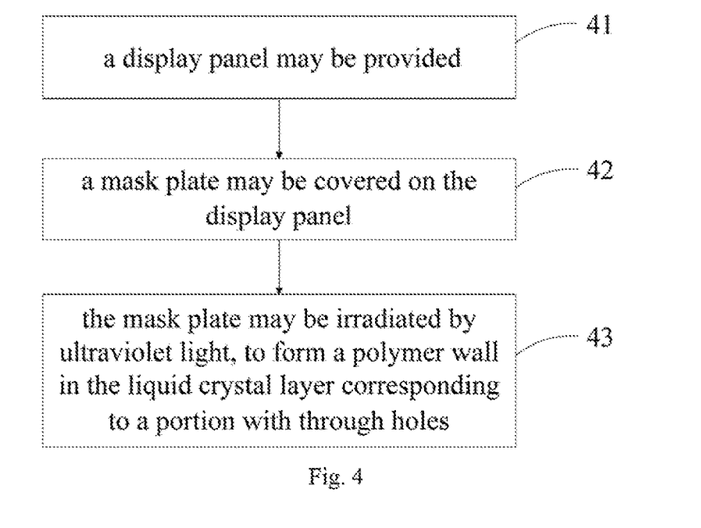
FIG. 4 is a flow chart of a preparation method for a display panel in accordance with an embodiment in the present disclosure.

Referring to FIG. 4, FIG. 4 is a flow chart of a preparation method for a display panel in accordance with an embodiment in the present disclosure. The preparation method may comprise:

Block 41: a display panel may be provided.

Figure 5:
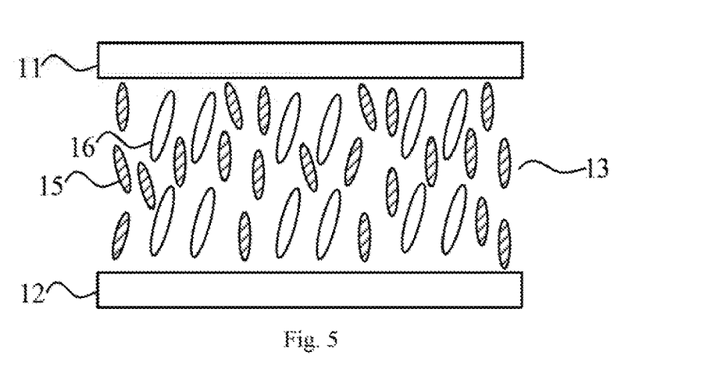
FIG. 5 is a structural illustration of a polymerizable monomer before polymerization of a preparation method for a display panel in accordance with an embodiment in the present disclosure.

Referring to FIG. 5, the display panel may comprise a first substrate 11, a second substrate 12 opposite to the first substrate 11, a liquid crystal layer 13 between the first substrate 11 and the second substrate 12, and the above-mentioned polymerizable monomer 15 and the liquid crystal molecule 16 arranged in the liquid crystal layer.

Block 42: a mask plate may be covered on the display panel.

Block 43: the mask plate may be irradiated by ultraviolet light, to form a polymer wall in the liquid crystal layer corresponding to a portion with through holes.

Figure 6:
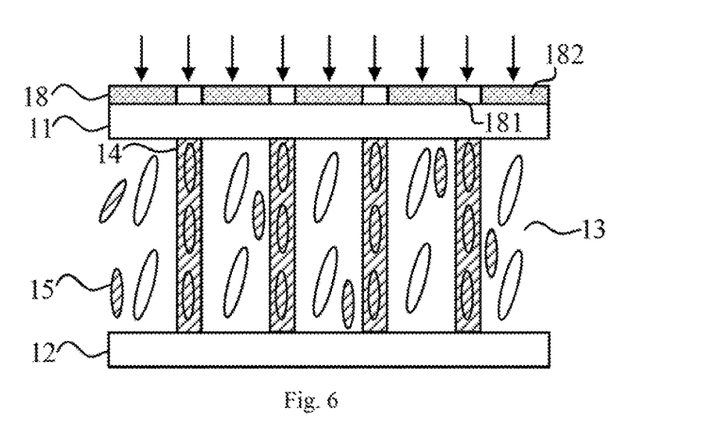
FIG. 6 is a structural illustration of a polymerizable monomer after polymerization of a preparation method for a display panel in accordance with an embodiment in the present disclosure.

Referring to FIG. 6, a portion 181 with through holes may be arranged in a mask plate 18. In order to form a polymer wall 14 in the liquid crystal layer 13, the display panel may be need to be irradiated by the ultraviolet ray, so that the polymer wall 14 may be formed in an area irradiated by the ultraviolet ray. Thus the mask plate 18 may comprise the portion 181 with through holes and a portion 182 without through holes.

The display panel may be irradiated by polarized ultraviolet with a specific wavelength, and the wavelength of the ultraviolet light may be 300 nm to 380 nm. The mask plate 18 may need to cover the ultraviolet during the irradiating, so that ultraviolet light may pass through the mask plate 18 via the portion 181 with through holes, to complete the polymerization reaction of the polymerizable monomer 15 in the liquid crystal layer 13. The polymer wall 14 may be formed, and the polymer wall 14 and the liquid crystal molecule 16 may be separated after the polymerization reaction is completed.

The polymer wall 14 may contact to the first substrate 11 and the second substrate 12. A polarization direction of the ultraviolet light may be substantially perpendicular to a thickness direction of the polymer wall 14. Because the polymerization direction of the polymerizable monomer 15 in the polymer wall 14 may be substantially perpendicular to the thickness direction of the polymer wall 14, the polymerization direction of the polymerizable monomer 15 in the polymer wall 14 may be substantially parallel to the polarization direction of the ultraviolet light. Referring to FIG. 6, the polarization direction of the ultraviolet light may be substantially perpendicular to the first substrate 11 and the second substrate 12, and the polymerization direction of the polymerizable monomers 15 may be also substantially perpendicular to the first substrate 11 and the second substrate 12.

It may be understood that, because the polymerization direction of the polymerizable monomer 15 may be the same as the polarization direction of the ultraviolet light, the polarization direction of the ultraviolet light may refer to the polymerization direction of the polymerizable monomer 15 in the above-mentioned embodiment. Therefore no additional description about the polarization direction of the ultraviolet light is given herebelow.

Figure 7:
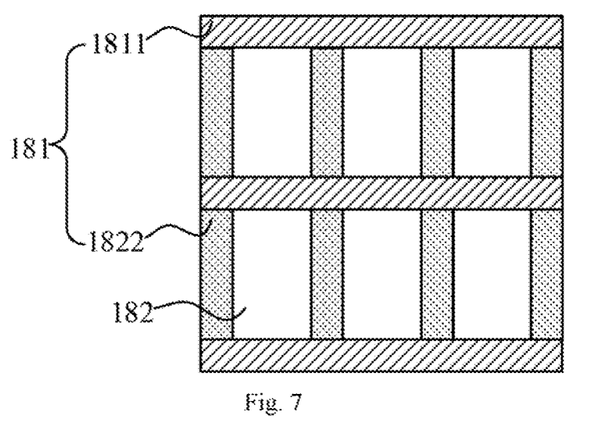
FIG. 7 is a mask plate of a preparation method for a display panel in accordance with an embodiment in the present disclosure.

Referring to FIG. 7, a plurality of first portions 1811 with through holes extending to a first direction and a plurality of second portions 1812 with through holes extending to a second direction may be arranged in the mask plate 18. The plurality of the first portions 1811 with through holes and the plurality of the second portions 1812 with through holes may be interlaced to form a grid shape. Each grid in the grid shape may correspond to a pixel.

As compared with the related art, in the preparation method for the display panel provided in the present embodiment, by covering the display panel by the mask plate to form the polymer wall, the polymer wall formed may restrict the flow of the liquid crystal. In addition, the polymerization direction of the polymerizable monomer in the polymer wall may be substantially parallel to the polarization direction of the ultraviolet light, therefore, the edge of the polymer wall may not occur the protrusions easily, and thereby the light leakage may be improved.

Figure 8:
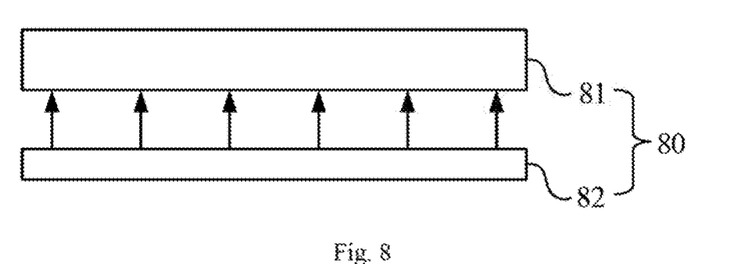

Referring to FIG. 8, FIG. 8 is a liquid crystal display in accordance with an embodiment in the present disclosure. The liquid crystal display may comprise a display panel 81 and a backlight 82.

In an embodiment, the display panel 81 may comprise: a first substrate, a second substrate opposite to the first substrate, a liquid crystal layer between the first substrate and the second substrate, and a polymerizable monomer arranged in the liquid crystal layer.

A plurality of polymer walls may be arranged in the liquid crystal layer. The polymer wall may contact to the first substrate and the second substrate. The polymer wall may be formed by the polymerization reaction of a polymerizable monomer 15. A polymerization direction of the polymerizable monomer in the polymer wall may be substantially perpendicular to a thickness direction of the polymer wall.

In another embodiment, the display panel 81 may be prepared by the following: a display panel may be provided;

the display panel may be covered by a mask plate; the mask plate may be irradiated by ultraviolet light, to form a polymer wall in the liquid crystal layer corresponding to a portion with through holes. The polymer wall may contact to the first substrate and the second substrate, and a polarization direction of the ultraviolet light may be substantially perpendicular to a thickness direction of the polymer wall.

In the above-mentioned description, when the polymerization reaction of the polymerizable monomer is proceeded in a specific direction, the polymer wall may be formed. The polymer wall may be formed at the gap between pixel regions to restrict the flow of the liquid crystal. The polymerizable monomer may be polymerized in a direction perpendicular to upper and lower substrates. It may prevent the edge of the polymer wall from being rough by the randomness property of the polymerization reaction, and may reduce the occurrence of light leakage.

It may be understood that, the above-mentioned display panel and the preparation method thereof may refer to the display panel and the preparation method in the above-mentioned embodiments, therefore no additional description is given herebelow.

The present disclosure further provides a liquid crystal medium mixture, the liquid crystal medium mixture may comprise a liquid crystal material and at least one of polymerizable monomer that may be proceeded the polymerization reaction by irradiating ultraviolet light. The polymerization reaction may be proceeded in a direction parallel to a polarization direction of the ultraviolet light, to form a polymer wall between liquid crystals, so as to limit the flow of liquid crystal. The polymerizable monomer may be the polymerizable monomer in the above-mentioned embodiments.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A liquid crystal display comprising a display panel and a backlight, wherein the display panel comprises:

a first substrate, a second substrate opposite to the first substrate, a liquid crystal layer between the first substrate and the second substrate, and a polymerizable monomer arranged in the liquid crystal layer;

wherein a plurality of polymer walls are arranged in the liquid crystal layer, and the plurality of polymer walls comprise a plurality of first polymer walls extending to a first direction and a plurality of second polymer walls extending to a second direction; the first direction and the second direction are substantially parallel to a surface of the first substrate; the plurality of the first polymer walls and the plurality of the second polymer walls are interlaced to form a grid shape, wherein each grid in the grid shape corresponds to a pixel;

wherein the polymerizable monomer comprises at least one of acrylate, acrylate derivatives, methacrylate, methacrylate derivatives, cinnamate, coumarin, styrylpyridine, styryl phthalimidine, and diphenylacetylene.

2. The liquid crystal display according to claim 1, wherein the plurality of polymer walls are contacted with the first substrate and the second substrate, and a polymerization direction of the polymerizable monomer in the polymer wall is substantially perpendicular to a thickness direction of the polymer wall.

3. The liquid crystal display according to claim 2, wherein the polymerization direction of the polymerizable monomer in the first polymer wall is substantially perpendicular to a thickness direction of the first polymer wall, and the polymerization direction of the polymerizable monomer in the second polymer wall is substantially perpendicular to a thickness direction of the second polymer wall.

4. The liquid crystal display according to claim 1, wherein a structural formula of the polymerizable monomer is selected from the group consisting of wherein a range of the n is 1-7, and a structural formula of the A is selected from the group consisting of -continued wherein structural formulas of the A1 and the A2 are selected from the group consisting of R, wherein the R is selected from the group consisting of $C_mH_{2m+1}$, $OC_mH_{2m+1}$, $C_mH_{2m}$, and $OC_mH_{2m}$, and the m is an integer between 1-30;

wherein the x1 and the x2 are selected from the group consisting of cyclopropane, cyclobutane, cyclopentane, cyclohexane, cyclopentadiene, and benzene.

5. A display panel comprising:

a first substrate, a second substrate opposite to the first substrate, a liquid crystal layer between the first substrate and the second substrate, and a polymerizable monomer arranged in the liquid crystal layer;

wherein a plurality of polymer walls are arranged in the liquid crystal layer; the plurality of polymer walls are contacted with the first substrate and the second substrate, and a polymerization direction of the polymerizable monomer in the polymer wall is substantially perpendicular to a thickness direction of the polymer wall;

wherein the plurality of polymer walls comprise a plurality of first polymer walls extending to a first direction and a plurality of second polymer walls extending to a second direction; the first direction and the second direction are substantially parallel to a surface of the first substrate; the plurality of the first polymer walls and the plurality of the second polymer walls are interlaced to form a grid shape, wherein each grid in the grid shape corresponds to a pixel;

wherein the polymerizable monomer comprises at least one of acrylate, acrylate derivatives, methacrylate, methacrylate derivatives, cinnamate, coumarin, styrylpyridine, styryl phthalimidine, and diphenylacetylene.

6. The display panel according to claim 5, wherein the polymerization direction of the polymerizable monomer in the first polymer wall is substantially perpendicular to a thickness direction of the first polymer wall, and the polymerization direction of the polymerizable monomer in the second polymer wall is substantially perpendicular to a thickness direction of the second polymer wall.

7. The display panel according to claim 5, wherein a structural formula of the polymerizable monomer is selected from the group consisting of wherein a range of the n is 1-7, and a structural formula of the A is selected from the group consisting of wherein structural formulas of the A1 and the A2 are selected from the group consisting of R, wherein the R is selected from the group consisting of $C_mH_{2m+1}$, $OC_mH_{2m+1}$, $C_mH_{2m}$, and $OC_mH_{2m}$, and the m is an integer between 1-30; wherein the x1 and the x2 are selected from the group consisting of cyclopropane, cyclobutane, cyclopentane, cyclohexane, cyclopentadiene, and benzene.

* * * * *